Jan. 11, 1927.
A. E. MAYNARD
LENS CUTTER
Filed April 5, 1924
1,614,078
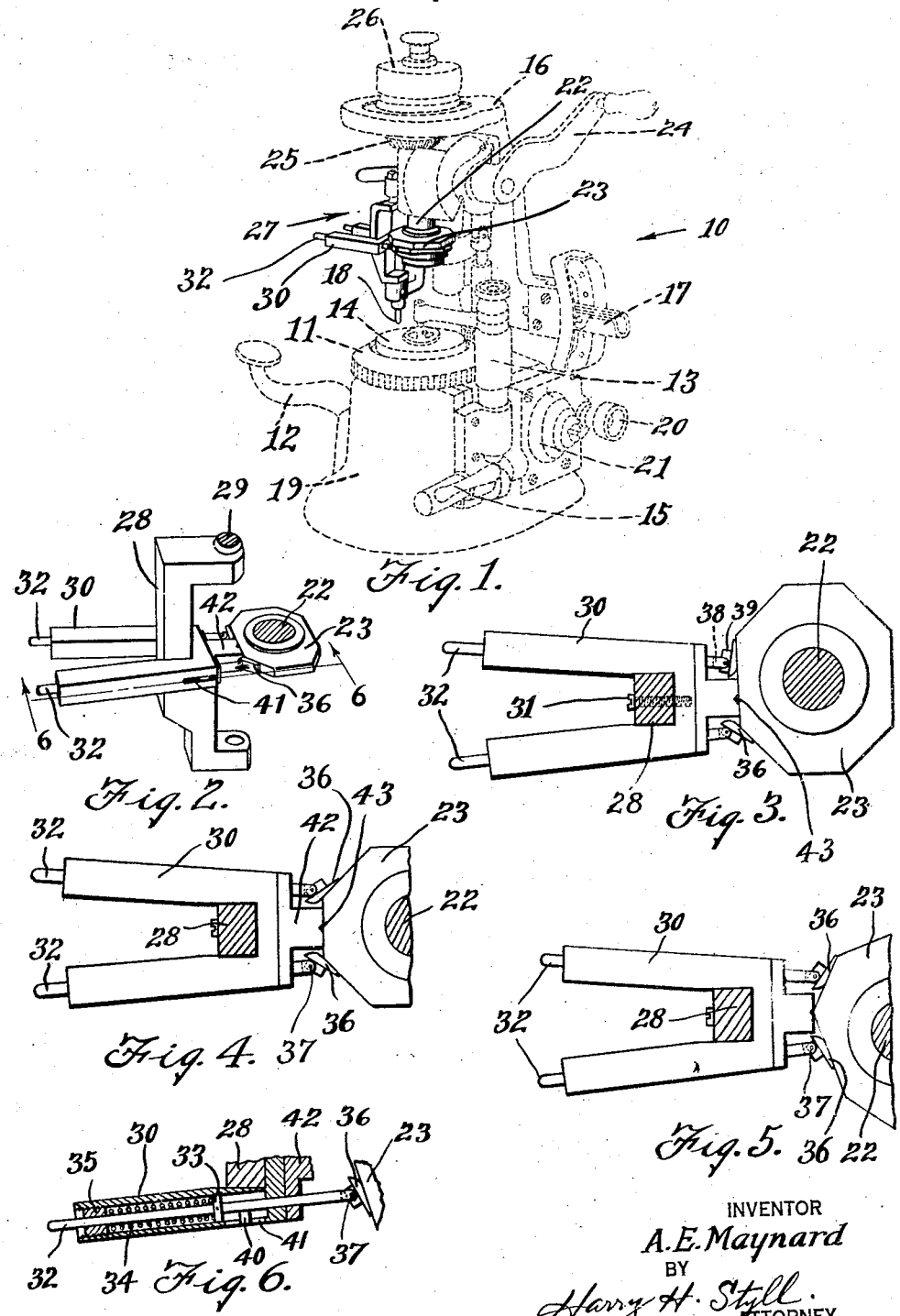
INVENTOR
A. E. Maynard
BY
Harry H. Styll
ATTORNEY

Patented Jan. 11, 1927.

1,614,078

UNITED STATES PATENT OFFICE.

ALBERT E. MAYNARD, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

LENS CUTTER.

Application filed April 5, 1924. Serial No. 704,528.

The present invention relates to an improved lens cutting machine and has particular reference to a former therefor.

An important object of this invention is to provide a former and contact shoe for use in connection with lens cutting machines that will permit the cutting of hexagonal and other similar shaped lenses.

Another important object of this invention is to provide a former and contact member for use in connection with lens cutting machines that will be adaptable to any shape of cutter former so that any desired shape of lens may be cut from a blank.

Another important object of the present invention is to provide a lens cutter former and contact member for use in connection with lens cutting machines that may be easily and readily mounted for use on the present form of cutting machine.

Another important object of the invention is to provide a device of this nature which will be strong, durable and inexpensive of construction and that will be adaptable for the uses for which it is designed.

Other objects and advantages of the invention will become apparent during the course of the description.

In the drawings, wherein like numerals are employed to designate like parts throughout the same:

Figure 1 is a perspective view of a lens cutting machine illustrating my invention when in use;

Figure 2 is a detailed perspective of my invention;

Figure 3 is a top plan thereof showing the elements in one position;

Figure 4 is a similar view showing the elements in another position;

Figure 5 is another view showing the elements in a still different position;

Figure 6 is a horizontal section taken on line 6—6 of Fig. 2, and looking downwardly.

In the drawings, wherein for purposes of illustration is shown the preferred embodiment of my invention, the numeral 10 designates a lens cutting machine such as is commonly used in the optical art. This machine includes a slidable lens supporting table 11, which is moved by means of the operating handle 12. A lens clamp 13 is provided to hold a lens 14 in position upon the table 11, said clamp being adapted to be swung into and out of operative position through the medium of the lever 15. The head 16 is adapted to be tilted by means of the lever 17 to permit of the proper positioning of the cutter 18 with respect to the lens 14. Any one of many desired adjustments may be had, and in addition the pivoted head may be moved transversely of the base 19, as by means of the screw feed mechanism 20, which movement is indicated by the indicating means 21. Depending from the head 16 is a former shaft 22 which supports a plurality of formers 23. The former shaft 22 and formers 23 are rotated as through the handle 24 and the gear mechanism 25. Mounted on top of the head 16 are means 26 to raise and lower the formers 23 to bring the desired former into contact with the cutter member, which is designated in its entirety by the numeral 27.

The cuttter member comprises a pivoted head 28 which is supported by means of suitable pin means 29. A yoke 30 which is provided with diverging arms, is mounted upon the head 28 and is fixed thereto by a suitable screw 31. Arranged within the diverging arms are spring pressed plungers 32 which carry a suitable plate 33, against which the coil spring or the like 34 bears. The opposite end of the coil spring 34 bears against a screw threaded hollow plug 35 arranged in the open end of the said arm. The opposite end of each plunger 32 extends a substantial distance through the yoke and supports a pivoted supplementary contact shoe 36. This contact shoe is carried by the pin 37 and is adapted to be pivoted. A suitable slot is formed in the end of the plunger, which is designated by the numeral 38, the end of the slot being so arranged that the base 39 of the supplementary contact shoes 36 will abut thereagainst to prevent the said shoe from becoming twisted out of operative position. A guide finger 40 is carried by the spring pressed plunger 32 and is operable in the slot 41 to prevent relative rotation of the shaft 32 within the arms 30, but which will permit of reciprocation thereof.

A contact shoe member 42 having a notch 43 is mounted between the supplementary contact shoes 36 and is adapted to bear against the desired former, as is clearly illustrated.

This construction of lens cutting machine cutter member is particularly well adapted for cutting irregular shaped lenses, such as hexagonal lenses and lenses having corners or abrupt changes in their edge contour. The main object of this invention is to overcome the trouble heretofore experienced with the cutting of irregular shaped lenses. In fact the majority of such irregular shaped lenses have in the past been ground to size and not cut prior to the grinding, thus prolonging the grinding operation, with the resultant high cost of manufacture.

In the present form of cutter member the yoke 30 is mounted upon the pivoted head 28, the said head being the same as is ordinarily used on the type of machine above described. The yoke 30 is provided with the divergent arms adapted to receive the spring pressed plungers 32 carrying at one end the pivoted supplementary contact shoes 36. The contact shoe 42 is adapted to bear against the former, as is clearly illustrated in Fig. 4 of the drawings, while the supplementary contact shoes bear on either side of the contact shoe 42 in such a manner that hexagonal or other types of lenses may be cut without the cutter head swinging out of operative position. As is shown, the supplementary contact shoes will hold the primary contact shoe 42 in proper relation with the former at all times due to the spring tension associated with the said supplementary shoes. The cutter member head and yoke will not swing until the notch 43 has reached a position as is clearly illustrated in Fig. 5. After this central position of the contact shoe 42 has been reached the cutter head will then swing around to the desired position and so on through to a complete cycle of operation. The shape of the contact shoes 36 is such that they will have a firm bearing against the cutter formers so that an even and regular cut will be made on the lens 14 in the desired shape, the shape of the lens being dependent upon the shape of the former used.

The operation may perhaps be more clearly understood if we take a concrete example and follow it through; as for example, we start on the flat side, as in Fig. 3, and rotate the former counter-clockwise; as the former comes around it pushes the whole cutting mechanism 27 away from the axis of rotation of the former. At the same time the pivoted head 28 and its associated parts are free to move about the pivot 29, said movement being controlled by the flat surface contact of the shoe 42 against the edge of the former, supplemented by the action of the secondary shoes 36 on the edge of the former. As the approaching angled corner of the former passes the first shoe 36, that shoe engages the adjoining face of the former and the main shoe 42 continues to engage the first edge of the former until the notch 43 is reached, whereupon the pivoted head 28 swings on its pivot 29 so that the second face of the former is engaged by the flat surface of the shoe 42. The engagement of the angled corner of the former with the notch 43 produces the desired result of changing the position of the cutting tool suddenly to maintain it in a line at all times normal to the cutting surface, the main shoe 42 making a sharp, sudden change in position to a position normal to the approaching surface on the former. The difference and the superiority of this form of tracking mechanism is that it insures the cutting of the lens with a sharp corner identical with the sharp corner on the former, whereas in prior constructions there was always a rounded section between the two adjoining faces of the cut lens which, of course, made the lens useless. This sharp corner is due entirely to the sudden and immediate swing of the main shoe 42 from one face of the former to the adjoining face of the shoe 42, always being normal to the former edge except at the instant when it passes over the corner. The notch 43 acts as a trigger to immediately swing the shoe 42 from one face of the former to the other. The supplementary contact shoes 36 are simply steady rests for the main shoe 42 as it swings over the corner of the former, as has been described, at which time these shoes 36 are each engaging a separate adjoining face of the former due to their yielding support. Where a curvilinear former of variable radii is used, the action of the supplementary contact shoes is the same, they simply act as steady rests for the main contact shoe 42, tending always to hold the shoe 42 normal to the edge of the former as it travels around its periphery.

It will be seen from the above that with the present form of cutter member construction any type or shape of lens may be readily cut prior to the grinding operation in such a manner that irregular shaped lenses, such as hexagonal or drop eye lenses, may be cut and ground with great rapidity.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Having thus described my invention, I claim:

1. The combination with a lens cutting machine, a cutter former, a cutter member comprising a head, a yoke carried thereby, a relatively rigid contact shoe carried by the yoke, plungers carried by the yoke, supplementary contact shoes carried by the plungers, and a cutting point carried by the head and adapted to travel in a path regulated by the former.

2. The combination with a lens cutting machine, a cutter former, a cutter member comprising a head, a yoke having diverging arms carried thereby, a contact shoe carried by the yoke, plungers arranged in the diverging arms, pivoted supplementary contact shoes carried by the plungers, and a cutting point carried by the head and adapted to travel in a path regulated by the former.

3. The combination with a lens cutting machine, a cutter former of irregular shape, a cutter member comprising a head, a yoke carried thereby, a contact shoe on the yoke, spring pressed plungers carried by the yoke, pivoted supplementary contact shoes carried by the plungers, and a cutting point carried by the head and adapted to travel in a path regulated by the former.

4. The combination with a lens cutting machine, a cutter former of irregular shape, a cutter member comprising a head, a yoke carried thereby, a contact shoe carried by the yoke and having a notch therein, spring pressed plungers arranged in the yoke, pivoted supplementary contact shoes carried by the plungers, means to prevent the plungers from axial turning, and a cutting point on the head.

5. The combination with a lens cutting machine, a cutter former of irregular shape, a cutter comprising a head, a yoke carried by the head and having diverging arms thereon, spring pressed plungers arranged in the arms and longitudinally movable therethrough, a guide finger on the plungers, pivoted supplementary contact shoes carried by the spring pressed plungers, a contact shoe mounted on the yoke and having a notch therein, and a cutting point on the head and adapted to travel in a path regulated by the former.

6. The combination with a lens cutting machine, a former, a cutting member comprising a pivoted head, a yoke mounted on the head adapted for movement therewith, said yoke having diverging arms, spring pressed plungers arranged within the diverging arms, means to prevent the plungers from axial turning, pivoted supplementary contact shoes carried by the plungers, means to restrict the pivotal movement of the supplementary contact shoes, a contact shoe carried by the yoke, and having a notch therein, said contact shoe being arranged between the supplementary contact shoes, and a cutting point on the pivoted head.

ALBERT E. MAYNARD.